Nov. 14, 1933.  K. MORSBACH ET AL  1,935,327
MOTION PICTURE FILM CAMERA
Filed June 20, 1931
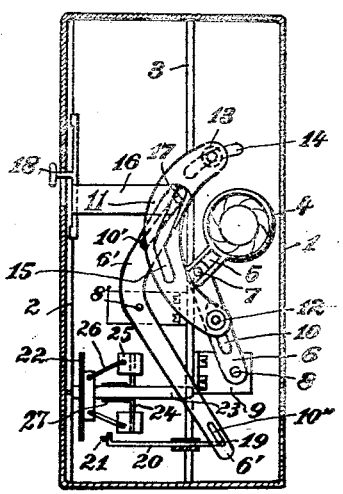
INVENTORS
KURT MORSBACH
KARL COUSIN
BY
Fitka & Kehlenbek
ATTORNEYS.

Patented Nov. 14, 1933

1,935,327

UNITED STATES PATENT OFFICE 1,935,327

MOTION-PICTURE FILM CAMERA

Kurt Morsbach, Berlin-Grunewald, and Karl Cousin, Berlin-Charlottenburg, Germany, assignors to Projector G. m. b. H., Berlin, Germany, a corporation of Germany Application June 20, 1931, Serial No. 545,640, and in Switzerland and Austria July 14, 1930

11 Claims. (Cl. 88—16)

Our invention relates to motion-picture film cameras, and particularly to such as have provisions for taking fast-motion and slow-motion pictures as well as making exposures at the normal rate. Our invention is an improvement on the construction disclosed in the application of one of us, Kurt Morsbach, for Letters Patent, filed in the United States Patent Office on June 18, 1930, Serial No. 461,881, which has matured into Patent No. 1,897,762 of February 14, 1933. In said patent, there is described an apparatus in which any change in the speed of operation from normal to slow-motion or fast-motion, or vice-versa, also effects automatically a proper change in the objective aperture as controlled by the shutter or diaphragm.

According to said patent, the change in the speed of operation is effected by the manual shifting of an element which controls the resistance of a brake device to adjust the speed of the film accordingly. In said earlier construction, a simple system of levers and links transmits motion from said element to the shutter or diaphragm of the objective (for instance an iris diaphragm) in such a manner that equal movements of said element will give equal angular movements to the adjusting member of the iris diaphragm. This arrangement is satisfactory, as a rule, when the objective is of such character that it will give a proper exposure with approximately the same aperture under all conditions of light, at normal film speed. Considerable difficulties arise, however, if the objective is of great luminosity (wide-angle lens) so as to yield a proper exposure even when taking slow-motion pictures of dark objects, for instance in cloudy weather or at dusk.

Let us assume, for instance, that the ratio of normal film speed to the film speed for slow-motion pictures is constant, say 1 to 4. Let us assume, further, that with overcast weather and normal film speed a proper exposure will be obtained with the relative aperture of 1:3. Then, with the same conditions of light a relative aperture of 1:1.5 will be required for a proper exposure when the film speed is set for slow-motion pictures, that is to say, when the film speed is increased fourfold, under the assumption made above. Let us also assume that an angular difference of 40° will correspond to these two shutter or diaphragm settings (1:3 and 1:1.5).

Let us assume that with bright sunlight and normal film speed the same object may be exposed properly with a relative objective aperture of 1:8. In this case, with the same light conditions, a relative aperture of 1:4 would be required at the film speed corresponding to slow-motion pictures. With iris diaphragms of customary construction, the relative aperture does not vary in direct ratio to the angular movement of the ring or like adjusting element, and we may therefore assume that an angular movement of about 25° will suffice to change said element from a position corresponding to the relative aperture of 1:8, to a position corresponding to the relative aperture of 1:4. If however the adjusting mechanism of said earlier application is employed, the diaphragm-adjusting ring will, under the circumstances just discussed, be given an angular movement of 40°, causing the diaphragm to be given a wrong relative aperture and increasing the time of exposure beyond the proper amount.

Our present invention avoids these drawbacks by providing a special connection between the element which adjusts the film speed and the member which controls the diaphragm aperture, the said connection being so constructed as to effect a proper co-ordination between the film speed and the diaphragm aperture, according to the normal adjustment of said aperture. According to the preferred form of our invention, the connection just referred to will, irrespective of the diaphragm aperture employed for normal film speed, effect the change from one film speed to another and a simultaneous change in the diaphragm aperture in such a manner that the two arbitrarily selected film speeds will be substantially in direct ratio to the squares of the corresponding relative diaphragm apertures.

In the present case, as in the patent mentioned, the camera preferably has a manually operated actuating member which at the same time constitutes an indicating member. According to our invention, said movable member is connected operatively with the adjusting element of the iris diaphragm in such a manner that when movements of like extent are given to said member, the ratio of the squares of the corresponding relative diaphragm apertures will remain substantially constant. It will be understood that like adjustments of said member produce a constant ratio between the two exposure numbers or frequencies corresponding to the two positions of said member at the beginning and at the end of the adjustment respectively. The construction of said operative connection will of course depend on the character of the iris diaphragm employed in each particular case.

The relations of certain movement factors explained above are derived from the well-known relation between time of exposure and relative aperture of diaphragm or objective, according to which two relative apertures are in inverse ratio to the square roots of the times of exposure. Since in motion-film practice the time of exposure is in inverse ratio to the picture frequency, it follows that the relative apertures will be in direct ratio to the square roots of the picture frequencies.

Reference is to be had to the accompanying drawing which shows in vertical section a satisfactory and very simple embodiment of our invention.

The camera casing 1 contains plates 2, 3 carrying the clockwork or spring motor (not shown) for operating the film-feeding mechanism and the shutter, in any well known or approved manner. The plate or partition 3 divides the casing into a motor compartment (at the left) and a film-holder compartment (at the right). In front of the film-holder compartment is located the usual objective (not shown) provided with a suitable diaphragm of variable aperture, for instance an iris diaphragm of well-known character, said diaphragm being provided with the customary adjusting ring 4 mounted to swing about its axis (which coincides with the optical axis of the objective) and operatively connected with the usual segments or leaves of the iris diaphragm. The ring 4 constitutes a rocking member and is provided with a lateral arm having a radial guide slot 5 into which projects a pin 7 on a lever 6. The latter is mounted to rock on a fulcrum 8 carried by a bracket 9 secured to the plate 3. The lever 6 is provided with a longitudinal slot 10 into which extends a pin 12 carried by an operating member in the nature of a curved lever 11. At its upper end, said lever is provided with an adjusting knob 13 located exteriorly of the camera casing, the shank of said knob extending through a slot 14 in the front wall of the casing, which slot is curved according to a circular arc centered on the optical axis of the objective and therefore on the axis about which the adjusting ring 4 swings. The curved lever 11 has a longitudinal slot 15 into which extends a pin 17 on an adjusting member 16 slidable vertically along the plate 2 and provided with an actuating knob 18 on the outside of the camera casing, the latter having a vertical slot in which the shank of the knob 18 moves up and down. The slot 15 is of peculiar shape, being so designed as to give the ring 4 the proper angular movement corresponding to the speed of the film, as explained above.

The parts described above serve to give the aperture-adjusting ring 4 different positions as the knob 18 is shifted, and at the same time the speed of the film is adjusted if the slide 16 is shifted, for which purpose we have shown the following mechanism: The pin 17 also extends through a longitudinal slot 10' in one arm of a lever 6' fulcrumed on the camera at 8', and the other arm of said lever has a longitudinal slot 10" into which projects a pin 19 on a bar or slide 20 movable laterally in suitable guides which may be carried by the plate or partition 3. The other end of said slide carries a brake shoe 21 adapted to be engaged by a rotary brake disk 22 held to rotate with a shaft 23, but capable of sliding lengthwise on said shaft. This shaft is rotated by a spring motor (not shown) which operates the film-feeding mechanism and other parts of the motion-picture camera. To the shaft 23 is secured rigidly a transverse pin 24 on which the fly-weights 25 are adapted to slide in and out. These weights are connected with the brake disk 22 by links 26 having pivot joints at each end. On the shaft 23 may be secured rigidly a sleeve or collar 27 one end of which is adapted to serve as a stop to limit the movement of the disk 22 in the direction in which it is shifted with increasing speed.

The operation will be understood readily. Let us assume that a slow-motion picture is to be taken (maximum film speed) and that the object to be photographed requires the iris diaphragm to be adjusted to full aperture. This condition or setting corresponds approximately to the position of the parts illustrated by the drawing. The brake shoe 21 is in the extreme right-hand position which it can take, and therefore the shaft 23 will be free to rotate at its maximum speed before the disk 22 engages said brake shoe. If now the apparatus is to be set for normal motion pictures, the knob 18 is shifted downwardly along the wall of the camera casing, say to a central position relatively to the length of the slot in said wall. The pin 17 will swing the lever 6' clockwise and the lever 11 contra-clockwise on their fulcrum points 8' and 13 respectively, and will produce simultaneously the following effects or adjustments: Rocking the lever 6' clockwise on 8' will reduce the film speed or picture frequency to normal, by moving the slide 20 and its brake shoe 21 toward the left, thereby bringing the disk 22 in contact with the brake shoe 21 at a lower speed than in the position illustrated, and thus causing the centrifugal governor to maintain a lower rotary speed. In addition, the contra-clockwise rocking of the lever 11, by rocking the lever 6 clockwise, swings the adjusting ring 4 of the iris diaphragm contra-clockwise and effects a corresponding alteration of the diaphragm aperture. The slot 15 of the lever 11 is of a peculiar irregular shape (in the embodiment illustrated, such slot consists of two straight portions at an obtuse angle to each other). The form of the slot 15 is plotted to secure the result indicated above; that is to say, the shape of the slot 15 is such that the ratio of the relative aperture at the end of the shifting movement of the knob 18, to the relative aperture at the beginning of such movement will be exactly or approximately proportional to the square root of the ratio of the film speeds after and before said shifting of the knob 18. Now let us assume that on account of a change in light conditions it is found desirable or necessary to use a different relative aperture, say at normal film speed. For this purpose the operator takes hold of the knob 13 and shifts it, together with the lever 11, into a new position, without however moving the adjusting member or slide 16 and its pin 17. Owing to the peculiar shape of the slot 15 the walls of which slide on the stationary pin 17, the pin 12 on the lever 11 will not move in the arc of a circle, but will describe a curve resulting from the bodily movement of the lever 11, about the optical axis of the objective, and from a rocking movement of said lever about the knob 13 as a temporary fulcrum. The movement of the pin 12 will rock the lever 6 and by means of the pin 7 shift the adjusting ring 4 to a new position, the shifting of the knob 13 being continued until the operator, by looking at the usual scale of the iris diaphragm adjustment, determines that the proper position has been reached for the desired relative aperture. It will be understood that shifting the knob 13 changes the relative aperture of the iris diaphragm, but does not affect the position of the slide 16, lever 6', and brake shoe 21, so that no change occurs in the film speed unless the slide 16 is shifted; shifting the slide 16, however, will not only change the film speed, but also the relative aperture of the iris diaphragm, as described above.

If, after adjusting the ring 4 independently as set forth above, the knob 18 is shifted, say to change the film speed from normal to the one used for slow-motion pictures or for fast-motion pictures, a new shifting of the ring 4 will occur simultaneously with the change in film speed, substantially in the same manner as the first described above, except that the slot 15 will have a different inclination relatively to the path of the knob 18 and will therefore swing the adjusting ring 4 through a different angle.

It will be noted that the guide slot 5 is open at its outer end, permitting the pin 7 to move out of said slot if the lever 6 should have a contra-clockwise movement exceeding a certain limit. This in an advantageous feature which insures the sensitive iris diaphragm mechanism against injury in the event of excessive clockwise movement of the lever 6, since in such case the adjusting ring 4 will no longer be actuated by the pin 7 after the lever 6 has exceeded a certain limit in its clockwise movement. This may occur, for instance, if the relative aperture for normal film speed has been adjusted to such a size that a change to the greater speed range would require adjustment of the diaphragm to an aperture greater than the maximum possible aperture of the objective. If desired, provision may be made for indicating visibly or audibly the fact that the maximum aperture of the objective has been reached.

The invention is not restricted to the particular embodiment illustrated. In particular, the arrangement of the mechanism connecting the adjusting members or knobs with the devices to be controlled thereby, will depend on the construction of the iris diaphragm employed. Thus, a connecting mechanism considerably simpler than the one shown could be employed between the knob 18 and the diaphragm-adjusting ring 4 if the adjusting mechanism operated by the ring 4 is so constructed that the relative aperture will vary in direct ratio to the angular movement of said ring, instead of varying, as customary hitherto, in direct ratio to the diameter of the aperture.

We may also embody our invention in a construction where the adjustment of the diaphragm aperture is effected not only by hand, but for instance by means of a centrifugal governor adjusting the pin 17 automatically in the slot 15 of lever 11 according to the speed existing at that particular time. Such an arrangement would be especially suitable for motion-picture cameras operated by hand (instead of using a spring motor).

These modifications and others may be made without departing from the nature of our invention as set forth in the appended claims.

We claim:

1. In a motion picture camera, a movable member for varying the relative aperture of the camera objective, another movable member controlling the speed of the film-feeding mechanism, and an operative connection which permits the first-mentioned member to be moved independently of the second, but compels both members to move in unison when the second-mentioned member is adjusted, whereby the objective aperture may be varied independently of the film speed, but adjustment of the film speed will be accompanied by an adjustment of the objective aperture.

2. A motion picture camera according to claim 1, in which the operative connection of the two movable members is so constructed that upon moving the second-mentioned member, the resulting film speeds at the beginning and at the end of such movement respectively will be substantially in direct ratio to the squares of the resulting relative objective apertures at the begining and the end of such movement respectively.

3. A motion picture camera according to claim 1, in which the first-mentioned movable member is a rocking member for controlling an iris diaphragm, and in which said operative connection is so constructed that equal movements of the second-mentioned member will produce different movements of said rocking member, corresponding to the relation existing between the angular movement of said rocking member and the relative aperture of the objective.

4. A motion picture camera according to claim 1, in which the second-mentioned movable member operates a lever which in turn operates a second lever.

5. A motion picture camera according to claim 1, in which the second-mentioned movable member operates a lever which in turn operates a second lever controlling the adjustment of the relative aperture of the objective, said levers being connected with each other by means which permits one of said levers to be moved independently of the other to adjust the relative objective aperture without changing the film speed.

6. A motion picture camera according to claim 1, in which the second-mentioned movable member actuates a lever controlling the adjustment of the relative aperture of the objective, said lever being mounted to rock on a fulcrum adjustable in the arc of a circle whose center is on the optical axis of the objective.

7. A motion picture camera according to claim 1, in which the first-mentioned movable member is a rocking member for controlling an iris diaphragm, and in which such rocking member has an open-end guide engaged by the element operating it, said element being adapted to come out of said open-end guide upon any excessive movement of said element, so as to avoid moving the rocking member beyond a limit position.

8. A motion picture camera according to claim 1, in which the first-mentioned movable member is a rocking member for controlling an iris diaphragm, and has an open-end guide, and in which said guide is engaged by a pin on a lever whereby upon any excessive movement of such lever, its pin will move out of the open-end guide so that the diaphragm-controlling member will not be rocked beyond a predetermined limit position.

9. In a motion picture camera, a movable member for varying the relative aperture of the camera objective, another movable member controlling the speed of the film-feeding mechanism, actuating means for shifting the first-mentioned member independently of the second, so as to change the aperture of the camera objective without altering the speed of the film-feeding mechanism, and additional actuating means for shifting both members in unison to effect adjustment of the aperture of the camera objective simultaneously with an alteration in the film speed.

10. In a motion picture camera, a movable member for varying the relative aperture of the camera objective, another movable member controlling the speed of the film-feeding mechanism, an operating member positively connected with said aperture-varying member so that any movement of said operating member will change the aperture of the camera objective, and actuating means connected with said speed-controlling member and also connected with said operating member loosely in such a manner that any movement of said actuating means will shift both the speed-controlling member and the said operating member, yet the latter will be capable of independent movement to change the aperture of the camera objective without altering the film speed.

11. In a motion picture camera, a movable member for varying the relative aperture of the camera objective, another movable member controlling the speed of the film-feeding mechanism, an operating member positively connected with said aperture-varying member so that any movement of said operating member will change the aperture of the camera objective, and actuating means operatively connected with said speed-controlling member and with said operating member in such a manner that any movement of said actuating means will shift both said speed-controlling member and said operating member, the latter being shiftable relatively to its point of connection with said actuating means to effect independent movement of the operating member and thereby change the aperture of the camera objective without effecting any change in the film speed.

KURT MORSBACH.
KARL COUSIN.